United States Patent [19]

Bauer et al.

[11] 4,039,224

[45] Aug. 2, 1977

[54] SAFETY BELT POSITIONING APPARATUS

[75] Inventors: Andreas Bauer; Erwin Blüggel, both of Fallersleben; Heinz Henning, Wolfsburg, all of Germany

[73] Assignee: Volkswagenwerk Aktiengesellschaft, Germany

[21] Appl. No.: 687,350

[22] Filed: May 17, 1976

[30] Foreign Application Priority Data

May 21, 1975 United Kingdom ............... 2522415

[51] Int. Cl.$^2$ .............................................. A62B 35/00
[52] U.S. Cl. ..................................... 297/389; 280/745
[58] Field of Search ................. 297/389, 388, 385; 280/745, 747

[56] References Cited

U.S. PATENT DOCUMENTS

| 3,526,431 | 9/1970 | Boedigheimer et al. | 297/389 X |
| 3,583,726 | 6/1971 | Lindblad | 280/745 |
| 3,618,975 | 11/1971 | Bombach | 297/389 X |
| 3,740,094 | 6/1973 | Horwyak | 297/389 X |
| 3,807,523 | 4/1974 | Fiala | 280/745 |
| 3,830,518 | 8/1974 | Silber | 280/745 |
| 3,833,239 | 9/1974 | Coenen | 280/745 |

FOREIGN PATENT DOCUMENTS

| 1,258,697 | 3/1961 | France | 280/745 |

Primary Examiner—James T. McCall
Attorney, Agent, or Firm—Brumbaugh, Graves, Donohue & Raymond

[57] ABSTRACT

An apparatus for positioning a vehicle safety belt, particularly a shoulder belt, includes a locking mechanism with multiple locking positions. Upon activation, the apparatus positions a safety belt around a vehicle passenger and the belt is retained in one of the locking positions according to the size of the passenger. The locking position is determined by the angle between the safety belt and a horizontal line.

13 Claims, 7 Drawing Figures

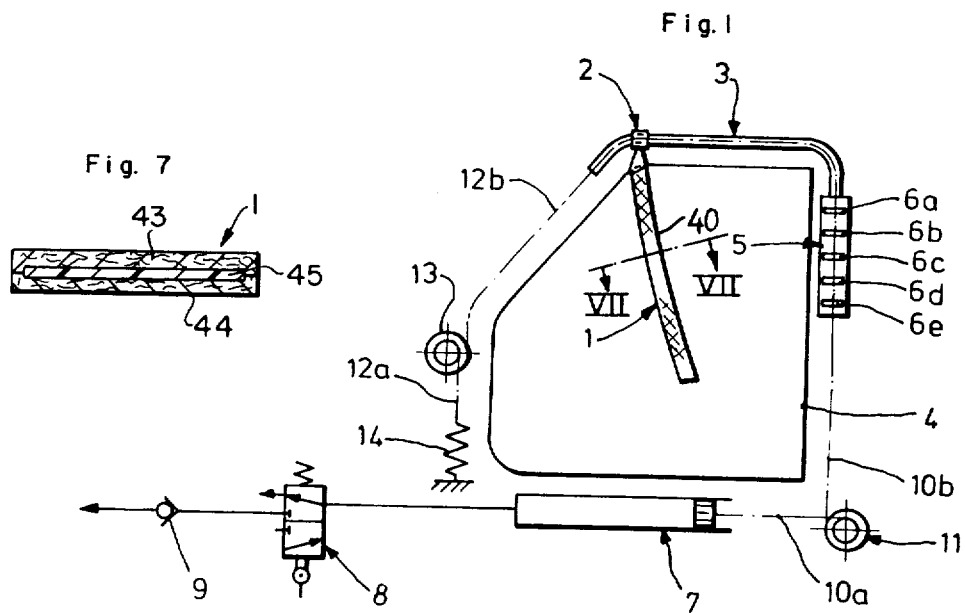
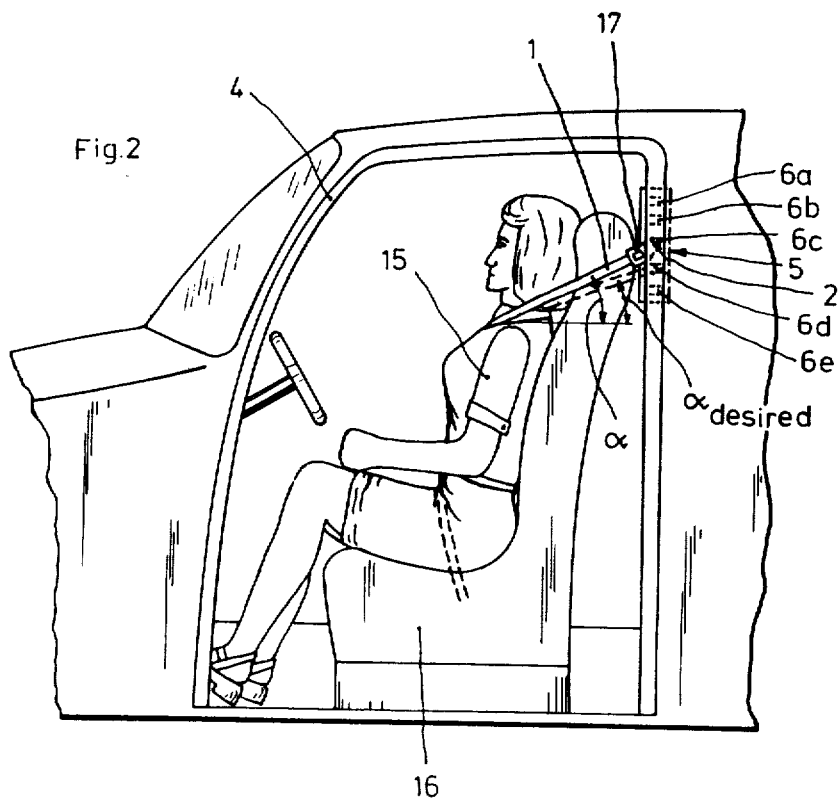

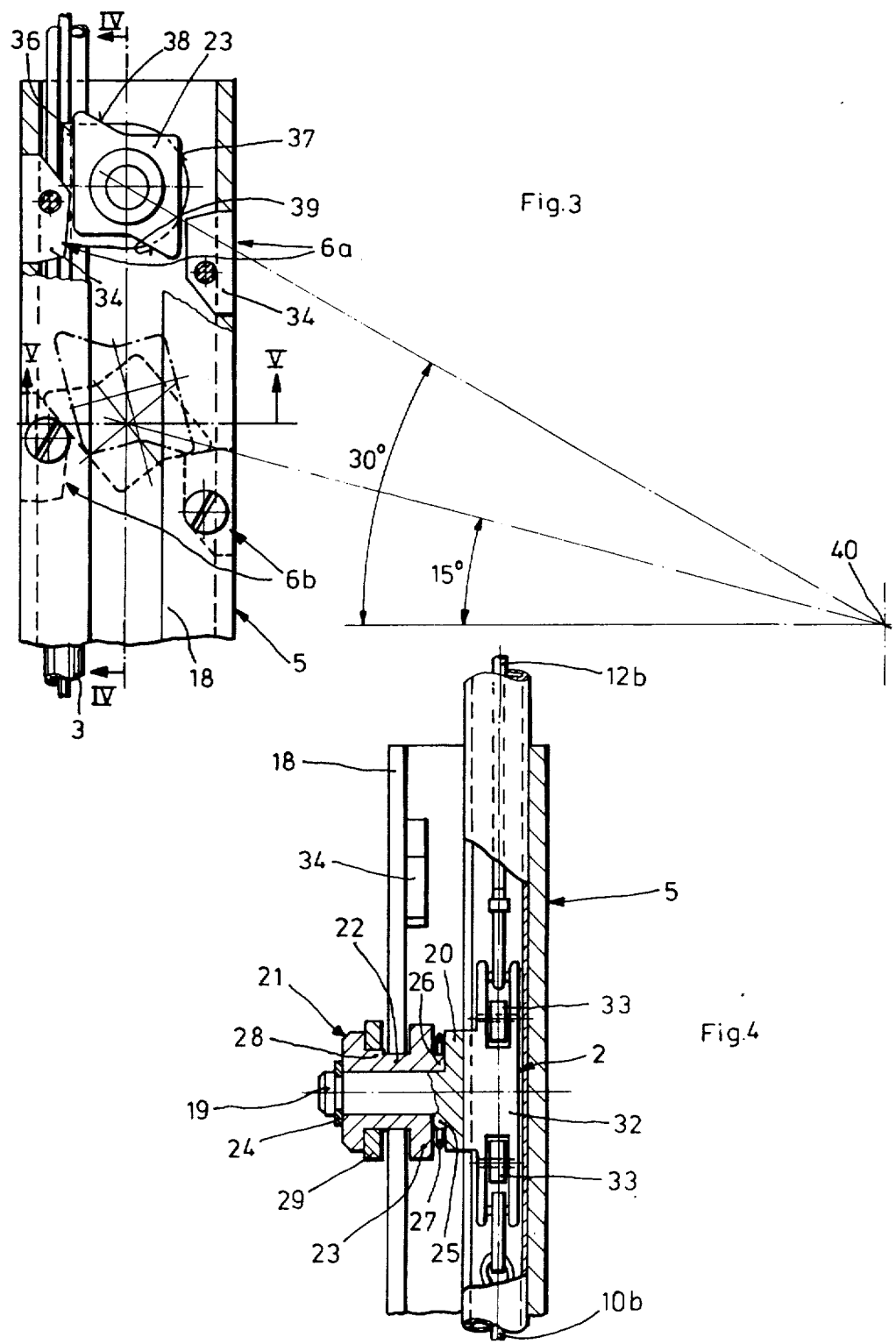

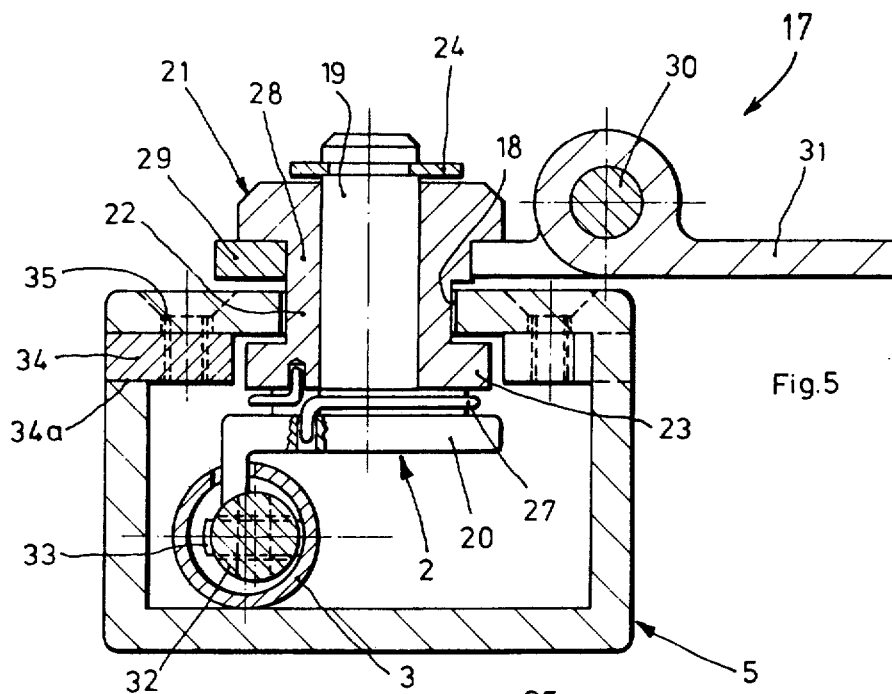
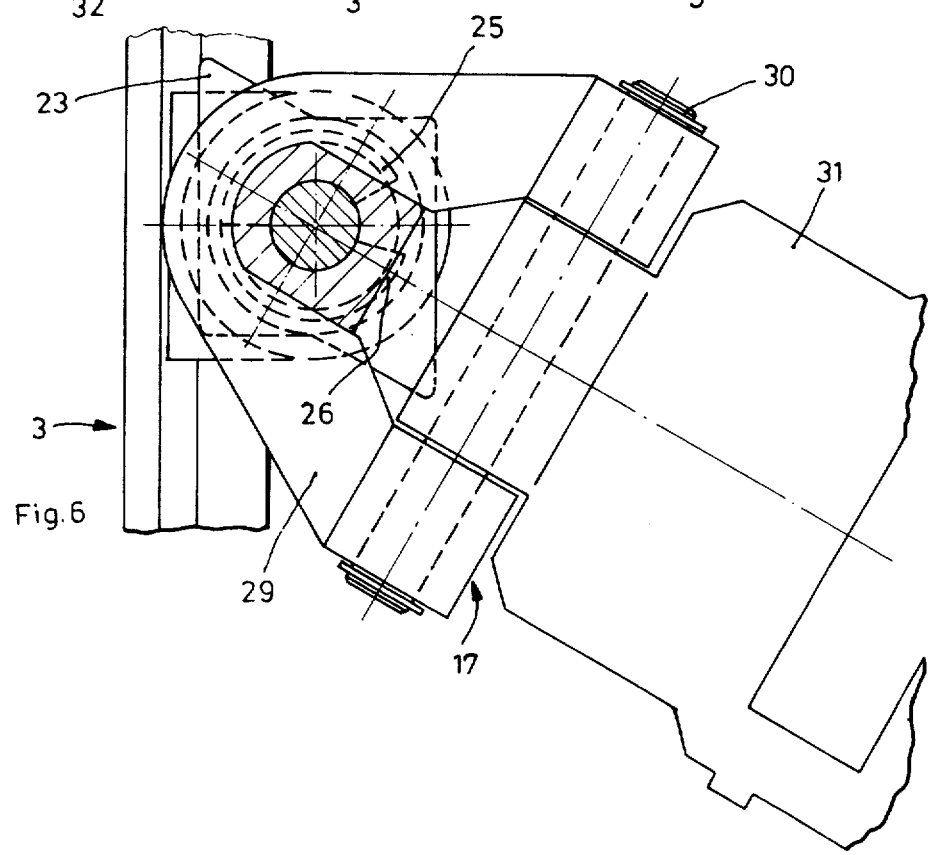

SAFETY BELT POSITIONING APPARATUS

BACKGROUND OF THE INVENTION

This invention relates to safety belt positioning apparatus, and particularly to apparatus for automatically positioning a safety belt about a vehicle occupant.

There have been known in the prior art passive safety belt devices which position a safety belt around a passenger upon his entering the vehicle. Some prior art devices make use of mechanisms attached to the vehicle door for applying one end of the safety belt to the passenger when the door is closed. In accordance with other prior art devices the safety belt is not attached to the door, but is attached to a carriage which moves in a track along the vehicle frame above the vehicle door. In such prior art devices the carriage is moved along the track by an activating device, such as an electric motor or gas pressure operated cylinder. When the vehicle engine is shut off, or the vehicle door is opened, the carriage is returned to the end of the track nearest the front of the vehicle lifting the safety belt off the passenger. When the device is activated, for example, by closing the door and starting the vehicle engine, the carriage is moved along the track toward the back of the vehicle and locks in a passenger restraining position adjacent the vehicle column. In the locked position the carriage is arranged to transmit forces on the safety belt to the vehicle column.

In accordance with such prior art devices the height of the locked position of the carriage on the column of the vehicle is not adjustable. Accordingly the shoulder safety belt will form an angle with the horizontal in accordance with the shoulder height of the passenger. When an exceptionally tall or short person is seated in the vehicle the locking position will be either too low or too high and will cause an improper and uncomfortable fit of the safety belt around the passenger.

It is therefore an object of the invention to provide a safety belt positioning apparatus wherein the belt carrying carriage may be locked at different heights on the vehicle column.

It is a further object of the present invention to provide such a system in which the height of the locked safety belt carriage is adjusted in accordance with the height of the vehicle passenger.

SUMMARY OF THE INVENTION

In accordance with the present invention there is provided an apparatus for automatically positioning a vehicle safety belt. The apparatus includes a track mounted to the vehicle, and a carriage movable along the track. There is additionally provided retaining means, pivotably mounted on the carriage for holding an end of the safety belt. Means are provided for automatically moving the carriage in the track between a passenger release position and a plurality of passenger restraining positions. There is finally provided means, responsive to the angle between the retaining means and the carriage, for locking the carriage in a selected one of the restraining positions.

In accordance with a preferred embodiment of the invention a locking element is provided on the retaining means which engages one of a series of stops arranged on the locking means. A restoring spring is provided between the retaining means and the slide carriage. The restoring spring unlocks the locking element from the stops when the carriage is returned to the passenger release position. In order to obtain the necessary angular motion of the retaining means against the restoring spring, the safety belt is preferably rendered stiff in the section adjacent to the retaining means.

For a better understanding of the present invention, together with other and further objects thereof, reference is made to the following description, taken in conjunction the accompanying drawings, and its scope will be pointed out in the appended claims.

BRIEF DESCRIPTION OF THE DRAWING

FIG. 1 is a schematic diagram of a safety belt positioning apparatus in accordance with the present invention.

FIG. 2 illustrates the installation of the apparatus of FIG. 1 on a vehicle.

FIG. 3 illustrates the locking mechanism associated with the apparatus of FIG. 1.

FIG. 4 is a longitudinal cross sectional view of the locking mechanism of FIG. 3.

FIG. 5 is a transverse cross sectional view of the locking mechanism illustrated in FIGS. 3 and 4.

FIg. 6 illustrates the safety belt retaining means of the FIG. 1 apparatus.

FIG. 7 is a cross-sectional view of the safety belt used in the FIG. 1 apparatus.

DESCRIPTION OF THE INVENTION

FIG. 1 is a schematic illustration of a preferred embodiment of the invention. Shown in FIG. 1 is a portion of a shoulder belt 1 the end of which is connected to a carriage 2 which moves in a track 3. The opposite end of belt 1 is connected to a roller at the center of the vehicle. Track 3 is arranged along the upper portion of a vehicle door opening 4. Carriage 2 is connected by cable 12b to roller 13, which also has cable 12a connected to spring 14. Carriage 2 is also connected to roller 11 by cable 10b. Cable 10a connects roller 11 to activating cylinder 7. Cylinder 7 is connected to the vacuum system of the automobile engine by one-way valve 9 and door activated valve 8. Guide 3 is terminated in locking mechanism 5 which has a plurality of locking positions 6a through 6e.

Prior to entry of a passenger into the vehicle, seat belt 1 is retained by carriage 2 in a forward, passenger release position. Carriage 2 is pulled into the passenger release position by the action of spring 14 which winds roller 13 to take up cable 12b. When a passenger enters the vehicle and closes the vehicle door, the closing of the door throws switch 8 which connects cylinder 7 to the vacuum system of the engine. When the engine is started, a vacuum is drawn in cylinder 7 whose piston pulls cable 10a winding roller 11 and pulling carriage 2 toward locking mechanism 5 by cable 10b.

FIG. 2 illustrates passenger 15 seated on vehicle seat 16. Shoulder belt 1 is placed about passenger 15 and retained in retaining means 17 which is pivotably mounted to carriage 2. Indicated in FIG. 2 is an angle $\alpha$ formed between the shoulder belt 1 and a horizontal line when the shoulder belt is resting on the shoulder of the passenger. In order to provide optimum passenger comfort and safety, it is desirable that independent of the shoulder height of passenger 15 the shoulder belt is locked in the locking mechanism 5 at a desired angle $\alpha$. The desired angle is approximately 15°.

In accordance with the present invention the interconnection of retaining means 17 and carriage 2 is designed so that carriage 2 will come into locking engagement with a selected one of the locking positions 6a through 6e at which the angle between safety belt 1 and the horizontal is approximately equal to the desired angle.

FIGS. 3 through 6 illustrate the detailed construction of the locking mechanism 5 and retaining means 17. The transverse cross sectional view of FIG. 5 illustrates that carriage 2 includes a guide portion 32 with wheels 33 located within track 3. Track 3 comprises a cylindrical tube having a continuous longitudinal slot. Guide portion 32 is attached through the slot of track 3 to a platform 20.

A rotating member 21 is pivotably mounted to platform 20 by bolt 19 and is secured by retaining ring 24. The rotation of member 21 with respect to platform 20 is limited by partial ring sectors 25 and 26, which are formed on platform 20 and member 21, respectively. Ring sectors 25 and 26 are interacting and therefore limit the angular rotation of member 21 with respect to platform 20. Return spring 27 is provided between platform 20 and member 21 and retains member 21 in an "unlocked" position, being one extreme of the rotation permitted by ring sectors 25 and 26.

A fastening strap 29 is mounted to rotating member 21 in a noncircular portion 28 and therefore rotates with member 21. Strap 29 is connected to lock tongue 31 by hinge 30 which facilitates pivoting of the belt to a comfortable position on the passenger. Tongue 31 forms one portion of a safety belt lock, the remaining portion of which is connected to belt 1. The belt lock is provided to enable release of the belt from the passenger restraining position illustrated in FIG. 2 in the event the positioning mechanism is disabled, for example by a collision. The release lock is preferably located adjacent the vehicle window to enable release of a passenger from the outside of the vehicle by rescue personnel.

A portion of rotating member 21 is formed into a locking element 23, which has a polygon shape. Locking element 23 is provided with parallel and opposite butting edges 36 and 37, which are parallel to track 3 when rotating member 21 is in the unlocked position under the force of spring 27. There are also provided an additional pair of butting edges 38 and 39, which are parallel to each other and at an angle with respect to edges 36 and 37.

FIG. 3 shows a partial view of locking mechanism 5 as seen from inside the vehicle. Locking mechanism 5 is in the form of a hollow rectangular box through which passes track 3. There is provided a longitudinal slot 18 which is open toward the upper side of the box and closed at the lower side of the box forming an extreme possible lower position for carriage 2. As seen in FIGS. 3, 4 and 5, a reduced cross sectional portion 22 of rotating member 21 is engaged in slot 18 when carriage 2 enters locking mechanism 5.

Within locking mechanism 5 are located stops 34 on either side of slot 18 at each of locking positions 6a through 6e. Stops 34 are each provided with upper and lower locking surfaces for engaging the butting edges 36, 37, 38 and 39 on locking element 23. Stops 34 are inserted within slots 34a on the side walls of locking mechanism 5 and are retained by screws 35, as illustrated in FIG. 5.

When locking element 23 is in its normal position under the force of spring 27, carriage 2 may freely pass along locking mechanism 5. When shoulder belt 1 is applied on the shoulder of a passenger, on further pulling of the carriage 2 toward the locking mechanism 5 by cable 10 angle α between the shoulder belt 1 and the horizontal line becomes smaller and shoulder belt 1 applies a rotational force to retaining means 17 causing rotation of rotating member 21 with respect to platform 20 against the force of spring 27. As indicated in FIG. 3 this rotation of rotating member 21 rotates locking element 23, causing butting edges 36 and 39 to engage the upper locking surfaces of stops 34 at a selected one of the locking positions 6a through 6e at which the angle α is approximately equal to the desired angle α.

The dimensions of locking element 23 and stops 34 are designed so that element 23 will pass between the stops until the belt 1 and with that retaining means 17, rotating element 21 and locking element 23 attains the desired angle α with respect to horizontal. When belt 1 has attained the desired angle, butting edge 39 engages the upper surface of one of stops 34 and under the downward force of cable 10b further rotates locking element 23 until surface 36 comes to rest in a locked position against the stop 34 on the opposite side of locking mechanism 5 (dotted lines in FIG. 3). Typically belt 1 will be retained at an angle α of 15° in the locked position. In order to provide optimum retention of locking element 23, stops 34 are provided with locking surfaces at different angles and are located at different longitudinal postions along locking mechanism 5. Stops 34 are provided with lower locking surfaces to prevent reverse motion of carriage 2 in the event the vehicle rolls over. The force of a passenger in such an event retains locking element 23 in the rotated position so that surfaces 37 and 38 of element 23 engage the lower surfaces of the stops 34 at the next higher locking position 6a in the event the vehicle rolls over.

The force of spring 27 returning rotating member 21 and locking element 23 to the unlocking position is preferably stronger than the retracting forces applied by the winding device at the opposite end of safety belt 1. This stronger spring force prevents rotation of retaining means 17 merely under the force of the belt winding device.

In order to facilitate rotation of retaining means 17 against the spring force when safety belt 1 is applied to the shoulder of a passenger, the end portion of safety belt 1, which extends between supporting point 40 of the belt on the shoulder of the passenger and retaining means 17, may be rendered less pliable than the remaining portion of the safety belt. This stiffening of belt 1 provides more effective transmission of rotation forces to retaining means 17 and may easily be achieved by making this portion of belt 1 with a double ply of the safety belt fabric 43, 44 as shown in FIG. 7. Additional stiffness may be provided by placing an insert 45 between the fabric plies 43, 44.

While there have been described what are believed to be the preferred embodiments of the present invention, those skilled in the art will recognize that other and further modifications may be had thereto without departing from the true spirit of the invention, and it is intended to cover all such embodiments which fall within the true scope of the invention.

We claim:

1. Apparatus for automatically positioning a vehicle safety belt, comprising:
   a track mounted to said vehicle;
   a carriage, movably arranged on said track;
   retaining means, pivotably mounted on said carriage, for holding an end of said safety belt;

means for automatically moving said carriage in said track between a passenger release position and a plurality of passenger restraining positions;

and means, responsive to rotation of said retaining means by said safety belt, for locking said carriage in a selected one of said restraining positions upon attainment of a selected angle between said belt and a horizontal line.

2. Apparatus as specified in claim 1 wherein said locking means includes a plurality of stops and wherein there is provided a locking element mounted to said pivotable retaining means, said locking element engaging said stops on attainment of a predetermined angle between said carriage and said retaining means.

3. Apparatus as specified in claim 2 wherein there is provided a spring for restoring said retaining means to a selected angle with respect to said slide carriage.

4. Apparatus as specified in claim 1 wherein said safety belt is stiffened in a portion adjacent said retaining means.

5. Apparatus as specified in claim 4 wherein said safety belt portion is stiffened by doubling the fabric ply of the safety belt and inserting a stiffening member between the fabric plys.

6. Apparatus as specified in claim 1 wherein there is provided a belt lock interconnecting said safety belt and said retaining means.

7. Apparatus as specified in claim 1 wherein there is provided a hinge on said retaining means.

8. Apparatus as specified in claim 1 wherein said locking means comprises a rectangular box-like housing having a slot arranged along a selected side and having a plurality of stops arranged in pairs within said housing on opposite sides of said slot.

9. Apparatus as specified in claim 8 wherein the stops in each of said pairs are offset with respect to each other along said slot and are provided with upper and lower locking surfaces which are inclined with respect to a plane perpendicular to said slot.

10. Apparatus as specified in claim 8 wherein said retaining means is provided with a locking element, arranged to pass between said stops on said locking means in an unlocking position and arranged to engage said stops when said retaining means is rotated with respect to said carriage by a selected angle from said unlocking position.

11. Apparatus as specified in claim 10 wherein said locking element comprises a polygon having a first pair of locking surfaces, substantially parallel to each other and parallel to said slot in said unlocking position, and a second pair of parallel locking surfaces, formed at an angle with respect to said first pair of locking surfaces, a selected locking surface from each of said pairs engaging said stops when said retaining means is rotated to a locked position.

12. Apparatus as specified in claim 3 wherein said carriage and said retaining means are provided with mutually interacting annular ring sectors for limiting the rotation of said retaining means between first and second limiting positions.

13. Apparatus as specified in claim 12 wherein said spring rotates said retaining means to an unlocking position, comprising one of the limiting positions of said interacting ring sectors.

* * * * *